(12) United States Patent
Shahsavar et al.

(10) Patent No.: US 10,829,389 B2
(45) Date of Patent: *Nov. 10, 2020

(54) SOLVENT DECONTAMINATION SYSTEM AND METHOD

(71) Applicant: Innocorps Research Corporation, Saskatoon (CA)

(72) Inventors: Aarya Shahsavar, Saskatoon (CA); Alexander Juin Hui Chan, Saskatoon (CA); Dawson Gordon James, Swift Current (CA)

(73) Assignee: Innocrops Research Corporation, Saskatoon (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/213,086

(22) Filed: Dec. 7, 2018

(65) Prior Publication Data

US 2019/0119127 A1  Apr. 25, 2019

Related U.S. Application Data

(63) Continuation of application No. 15/026,436, filed as application No. PCT/CA2014/000710 on Sep. 29, 2014, now Pat. No. 10,196,285.

(Continued)

(51) Int. Cl.
*C02F 1/04* (2006.01)
*B01D 1/16* (2006.01)
(Continued)

(52) U.S. Cl.
CPC ............ *C02F 1/048* (2013.01); *B01D 1/0047* (2013.01); *B01D 1/0094* (2013.01); *B01D 1/16* (2013.01);
(Continued)

(58) Field of Classification Search
CPC .... C02F 1/04; C02F 1/048; C02F 1/06; C02F 1/10; B01D 1/0041; B01D 1/0047;
(Continued)

(56) References Cited

U.S. PATENT DOCUMENTS 3,833,479 A   9/1974 Fredriksson
5,096,543 A   3/1992 Elmore
(Continued)

FOREIGN PATENT DOCUMENTS

DE        3435614 A1   4/1986
WO    2010063341 A1   6/2010

OTHER PUBLICATIONS

Response to Non-Final Office Action filed in counterpart U.S. Appl. No. 15/026,436 dated Mar. 20, 2018.
(Continued)

*Primary Examiner* — Brian A McCaig
(74) *Attorney, Agent, or Firm* — Olive Law Group, PLLC (57) ABSTRACT

A system and method for decontaminating a fluid like a non-azeotrope solvent such as water, wherein a transport gas is maintained at a temperature between the freezing point and boiling point at atmospheric pressure of the solvent and continuously circulated between an evaporation chamber and a condensation chamber, a contaminated solvent is introduced into the transport gas in the evaporation chamber under process heat and contaminant precipitates out, and the cleaned solvent cools in the condensation chamber releasing heat to be used in the evaporation chamber. A heat pump is used to promote evaporation and condensation within the system.

17 Claims, 6 Drawing Sheets

Related U.S. Application Data (60) Provisional application No. 61/885,556, filed on Oct. 2, 2013.

(51) Int. Cl.
  *B01D 1/00* (2006.01)
  *B01D 5/00* (2006.01)
  *C02F 1/10* (2006.01)
  *C02F 103/34* (2006.01)

(52) U.S. Cl.
  CPC ........... *B01D 5/0003* (2013.01); *B01D 5/006* (2013.01); *B01D 5/0027* (2013.01); *B01D 5/0039* (2013.01); *C02F 1/10* (2013.01); *C02F 2103/34* (2013.01); *C02F 2303/10* (2013.01); *Y02B 30/52* (2013.01)

(58) Field of Classification Search
  CPC . B01D 1/16; B01D 3/007; B01D 3/06; B01D 3/346
  See application file for complete search history.

(56) References Cited

U.S. PATENT DOCUMENTS

| | | |
|---|---|---|
| 2012/0205236 A1 | 8/2012 | Govindan et al. |
| 2012/0241308 A1 | 9/2012 | Urwin et al. |

OTHER PUBLICATIONS

Examination report issued in counterpart AU Application No. 2014331471 dated Nov. 17, 2017 (four (4) pages).
Extended European Search Report issued in counterpart EP Application No. 14851286.6 dated Apr. 26, 2017 (thirteen (13) pages).
First Office Action issued in counterpart CN Application No. 201480054818 dated Dec. 5, 2016 (seventeen (17) pages).
International Search Report dated Dec. 8, 2014 for PCT International Application No. PCT/CA2014/000710.
Klausner, James F. et al., "Innovative Fresh Water Production Process for Fossil Fuel Plants" Department of Mechanical and Aerospace Engineering, University of Florida, Sep. 2003 (fifty-two (52) pages).
Klausner, James F. et al., Innovative Fresh Water Production Process for Fossil Fuel Plants, Department of Mechanical and Aerospace Engineering, University of Florida, Sep. 2005.
Non-Final Office Action issued in counterpart U.S. Appl. No. 15/026,436 dated Dec. 20, 2017.
Notice of Acceptance issued in counterpart AU application No. 2014331471 dated Jun. 27, 2018 (three (3) pages).
Notice of Allowance issued in counterpart U.S. Appl. No. 15/026,436 dated Jun. 27, 2018.
Written Opinion of the International Searching Authority dated Dec. 8, 2014 for PCT International Application No. PCT/CA2014/000710.
Thulukkanam, K. (2013) Heat Exchangers Design Handbook, 2nd ed., CRC Press, 1260 pages [Office action cites p. 1].
Notice of Allowance issued in counterpart U.S. Appl. No. 15/026,436 dated Sep. 26, 2018.

SOLVENT DECONTAMINATION SYSTEM AND METHOD

CROSS REFERENCE TO RELATED APPLICATIONS

This is a continuation patent application to U.S. patent application Ser. No. 15/026,436, filed Mar. 31, 2016, which is a 371 application that claims the benefit of PCT International Patent Application PCT/CA2014/000710, filed Sep. 29, 2014, which claims the benefit of U.S. Provisional Patent Application No. 61/885,556, filed Oct. 2, 2013; the contents of which are incorporated herein by reference in their entireties.

FIELD OF THE INVENTION

The present invention relates to systems and methods for decontaminating solvents such as industrial process water.

BACKGROUND OF THE INVENTION

It is known in the art of treating contaminated solvents such as effluent water to employ evaporation and condensation stages in an effort to remove solutes, using a variety of systems and methods. However, conventional solvent treatment systems generally lack the ability to process a broad range of effluent produced from common industrial practices. For example, membranes made from organic polymers or compounds are susceptible to corrosion, therefore limiting their ability to process tailings from oil, gas or mining operations or chemical waste products. Systems for distilling water such as large boilers are well known to encounter scaling and maintenance issues, and moreover require a large amount of additional energy to bring the solvent to a vapor phase. Vacuum or high pressure systems must be designed to safely contain the processes and require additional turbo-machinery, which significantly increases costs. Finally, zero-liquid discharge systems that incorporate crystallizers typically use high-cost titanium to prevent corrosion in the high-pressure, high-temperature environments employed.

Many prior art systems have been developed to process contaminated solvent. For example, U.S. Pat. No. 7,121,101 to Merritt discloses a potable water production apparatus that uses a closed loop air cycle with vapour compression refrigeration; however, the condensing system is operated at or below freezing, thereby introducing complexity and additional cost.

What is needed, therefore, is a relatively simple treatment system that can operate at or near atmospheric pressure and temperature conditions for treating water or a variety of other non-azeotrope solvents, and preferably achieving desirable efficiencies at a lower cost than most conventional systems.

SUMMARY OF THE INVENTION

The present invention therefore seeks to provide a closed loop evaporation and condensation system operating at or near atmospheric pressure and utilizing a gas as a transport medium with the gas circulating between evaporation and condensation areas and conditions, for separating non-azeotrope liquids of various vapor pressures and chemical concentrations of colloids, suspensions, solutes, particulates and other contaminants. The input and output solvent streams are in liquid form, with the gas temperature between the melting point and boiling point of the contaminated solvent, at or near atmospheric pressure. Evaporation occurs because of a chemical concentration gradient due to psychrometric effects such that (a) the input gas to the evaporator contains a low concentration of solvent vapor and (b) the output gas from the evaporator consists of a higher concentration of solvent vapor than the input. Condensation occurs due to a decrease in saturation vapor pressure of the gas below that of the vapor pressure of the gas-vapor mixture. The energy released by the vapor in the condensation chamber is transferred to the evaporator chamber. The output stream has a lower concentration of contaminants than the input stream, and the system preferably produces zero liquid discharge by recirculating this concentrated waste stream back into the system. The input contaminated solvent can be preheated using exhaust heat in the system and from the outputs. Improvement of energy efficiency and solvent recovery efficiency over prior art is derived from the use of a heat pump facilitating energy recapture within the condenser and insertion within the evaporator. Process fluid (in the form of either a portion of the contaminated fluid or a portion of the purified fluid) is cooled using the heat pump, and the removed heat is used in the evaporation chamber to enable saturation of the transport gas while the now-cooled process fluid is directly (for the purified fluid) or indirectly (for the contaminated fluid or the purified fluid) used to cool the solvent-saturated transport gas and promote condensation within the condensation chamber.

According to a first broad aspect of the present invention, there is provided a system for at least partial decontamination of a contaminated fluid to produce a purified fluid, the system comprising:

process fluid containment means for containing the contaminated fluid and the purified fluid;
  an evaporation region for at least partially evaporating the contaminated fluid to form an evaporated fluid;
  a condensation region for condensing the purified fluid;
  the evaporation region and the condensation region in fluid communication;
  the evaporation region and the condensation region retaining a transport gas for transporting the evaporated fluid to the condensation region, the transport gas becoming at least partially saturated with the evaporated fluid in the evaporation region, the transport gas releasing the purified fluid in the condensation region;
  inlet means for introducing the contaminated fluid to the evaporation region;
  purified fluid outlet means for withdrawing the purified fluid from the condensation region;
  process fluid supply means for supplying from the process fluid containment means a process fluid in the form of either the contaminated fluid or the purified fluid to cool the transport gas to promote condensation in the condensation region; and
  heat exchange means;
  wherein the process fluid passes through the heat exchange means to remove heat from the process fluid to form a cooled process fluid, and the cooled process fluid subsequently draws heat from the transport gas to promote condensation of the purified fluid in the condensation chamber; and
  wherein the heat removed from the process fluid by the heat exchange means is used to promote evaporation of the contaminated fluid in the evaporation region.

In some exemplary embodiments of the present invention, the evaporation region and the condensation region form a closed loop, the system further comprising circulation means for continuously circulating the transport gas between the evaporation region and the condensation region. Contaminant outlet means may also be provided for withdrawing contaminant from the closed loop; alternatively the contaminant may simply be recycled into the contaminated fluid. The process fluid may be substantially composed of either a portion of the purified fluid or a portion of the contaminated fluid. Where the process fluid is substantially composed of a portion of the purified fluid, it can be cooled and subsequently injected into the condensation region, and the cooled process fluid can be atomized through the injection to create nucleation sites to promote condensation. Where the process fluid is substantially composed of contaminated water that has not yet been purified, it can be cooled and used to subsequently indirectly draw heat from the transport gas to promote condensation of the purified fluid in the condensation chamber, and the cooled (contaminated) process fluid can then be returned to the process fluid containment means after drawing heat from the transport gas.

According to a second broad aspect of the present invention, there is provided a method for at least partially decontaminating a contaminated fluid to produce a purified fluid, the method comprising the steps of:

a. subjecting part of the contaminated fluid to evaporation conditions;
b. evaporating the part of the contaminated fluid to form an evaporated fluid;
c. condensing a purified fluid from the evaporated fluid;
d. supplying a process fluid, in the form of a portion of either the contaminated fluid or the purified fluid, to a heat exchanger;
e. allowing the heat exchanger to remove heat from the process fluid to form a cooled process fluid;
f. using the heat removed by the heat exchanger for the evaporating of the part of the contaminated fluid to form the evaporated fluid; and
g. using the cooled process fluid to remove heat from the evaporated fluid, to promote the condensing of the purified fluid.

In some exemplary embodiments of this method, a further step after step c. may be included of retaining at least a portion of the purified fluid for subsequent supply to the heat exchanger. The method may further comprise the step after step b. of transporting the evaporated fluid to an area where the condensing of step c. takes place; such transporting is preferably enabled by a transport gas, the transport gas allowed to become at least partially saturated with the evaporated fluid before movement to the area where the condensing of step c. takes place. Such transport gas is preferably circulated after step g. back to an area where the part of the contaminated fluid is evaporated to form the evaporated fluid. In some exemplary embodiments of the method step b. may further comprise removing contaminants from the contaminated fluid by means of the evaporating of the contaminated fluid.

In some exemplary methods the cooled process fluid is derived from the purified fluid, and step g. may further comprise injecting the cooled process fluid into the evaporated fluid. Such injection may include atomization of the cooled process fluid, creating nucleation sites to promote condensation.

Where the process fluid is the portion of the contaminated fluid, some exemplary methods may comprise the steps after step g. of introducing at least a part of the portion of the contaminated fluid to evaporation conditions;

evaporating the at least a part of the portion of the contaminated fluid to form part of the evaporated fluid; and condensing purified fluid from the part of the evaporated fluid.

Where the process fluid is the portion of the purified fluid, exemplary embodiments may further comprise the step after step g. of retaining the portion of the purified fluid. Where the process fluid is the portion of the purified fluid, exemplary methods may further comprise the step after step g. of reusing the portion of the purified fluid for condensing further purified fluid.

A detailed description of exemplary embodiments of the present invention are given in the following. It is to be understood, however, that the invention is not to be construed as being limited to these embodiments.

BRIEF DESCRIPTION OF THE DRAWINGS

In the accompanying drawings, which illustrate exemplary embodiments of the present invention.

Exemplary embodiments of the present invention will now be described with reference to the accompanying drawings.

DETAILED DESCRIPTION OF EXEMPLARY EMBODIMENTS

The following terms are used in this specification and have the following meanings as understood within the context of those skilled in the art:

"contaminated fluid": a fluid that is contaminated with colloids, suspensions, solutes, particulates and other contaminants, recognizing that some contaminants may not be capable of removal using the present invention;

"purified fluid": a fluid that has been subjected to the evaporation-condensation system and method taught herein, and at least some percentage of contaminant presence has been removed thereby;

"process fluid": a fluid that will be or has been processed using the evaporation-condensation system and method taught herein, and may comprise contaminated fluid or purified fluid depending on the context;

"chamber", "region", "area": these terms are used interchangeably to refer to a volume in which an action is taking place, for example evaporation or condensation;

"process fluid containment means": any means or structure for containing or otherwise constraining or restricting a process fluid, for non-limiting example a storage vessel or pipe system;

"contaminant": one or more colloids, suspensions, solutes, particulates and/or other contaminants, which may or may not be amenable to removal using the systems and methods taught herein.

In some exemplary embodiments of the present invention, a system is provided comprising:
a) an evaporation chamber;
b) a gaseous working fluid at or near atmospheric pressure;
c) a circulation mechanism for moving the gaseous working fluid;
d) liquid inlets into the evaporation chamber for introducing the solvent to be processed;
e) a condensation chamber in fluid communication with the evaporation chamber;
F) a cooling fluid operating on a separate heat pump cycle but thermally connected to the evaporation and condensation chambers to promote condensation and evaporation;
g) a means to collect the treated solvent; and
h) a means to remove the precipitated solute from the evaporation chamber.

Figure 6:
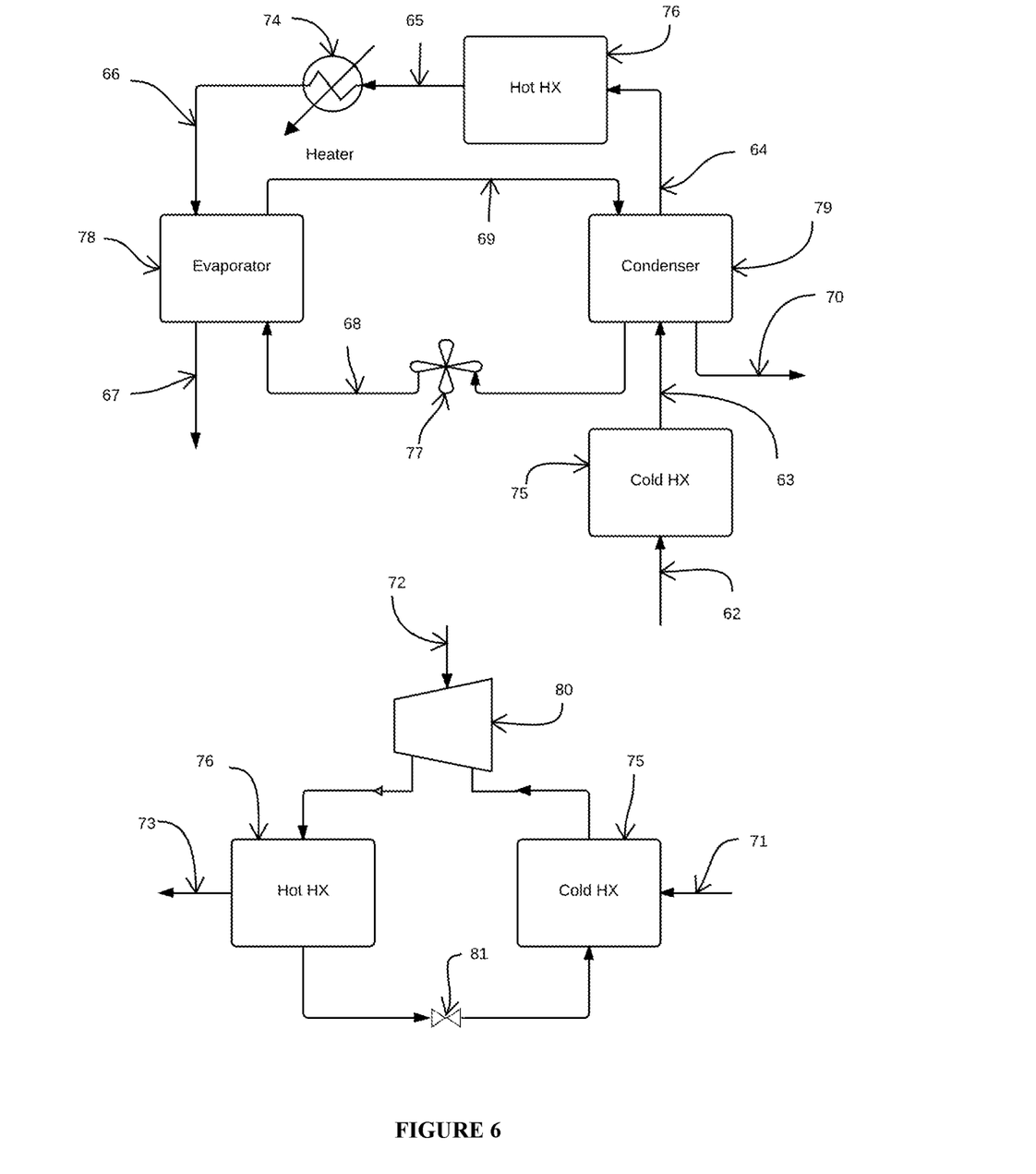
FIG. 6 is a schematic view of a further exemplary system according to the present invention.

The evaporation and condensation chambers may operate in any desirable configuration, for example with several evaporators in parallel or series, as would be known to one skilled in the art having recourse to the within disclosure. Exemplary apparatuses and systems according to the present invention can be controlled by conventional heat balance and humidity control systems. FIG. 6 is accompanied by exemplary equations and describes a way of modeling the present invention.

According to exemplary embodiments of the present invention, a system and method is provided in which a liquid solvent such as water that is contaminated with solutes, colloids, suspensions, particulates and the like can be separated into a less contaminated solvent by means of psychrometric processes. The solvent to be treated is introduced to the evaporation chamber in liquid form. A transport gas, which in a non-limiting example is air, is circulated within a closed system to pass near vapor-saturated air from an evaporation chamber and subsequently into a condensation chamber wherein the solvent is removed from the gas. The gas, now at a lower humidity ratio than prior to the condensation chamber, is then reintroduced into the evaporation chamber, where it absorbs vapor from the solvent until it is preferably near saturation and cycles through the system again. In the condensation chamber, preferably by means of either a direct or indirect heat exchanger (incorporated into a closed-loop heat pump), the temperature of the gas-vapor mixture is lowered such that the saturation vapor pressure of the mixture is lower than the current vapor pressure, causing condensation of the solvent from vapor form into liquid form. The energy recovered from this process is transferred to the gas and/or contaminated solvent entering the evaporation chamber from the condensation chamber using the heat pump, raising the temperature of the gas and/or contaminated solvent in the evaporation chamber and thereby increasing the saturation vapor pressure. Through continued circulation of gas and the working fluid within the heat pump, the solvent can be separated from contaminants present in the input stream.

The solvent can be evaporated in a way that optimizes airflow and surface area but prevents aerosolizing of contaminants into the gas within the evaporation chamber. The temperature of the working transport gas is between the freezing point and boiling point at atmospheric pressure of the solvent or solvents being processed, thus eliminating the need for substantial additional heat to be added through boilers or other methods as is typical with other conventional distillation or treatment processes.

The first exemplary system consists of two closed-loop cycles, one a heat pump that can be modelled ideally as a Carnot cycle in the maximum theoretical efficiency limit, the other an adiabatic system that consists of an evaporator and condenser. Within the heat pump, a small amount of work is added to the system to transfer a large amount of heat from the condenser to the evaporator. This heat that is transferred by the heat pump is used to change the operating conditions in the second loop. A working gas at ambient conditions circulates from the evaporating chamber where the contaminated solvent is introduced (modelled as an adiabatic saturator) to a condensation chamber continuously. Condensation occurs by lowering the temperature of the gas-solvent vapor to below the dew point of the solvent-gas mixture. The heat that is released by the purified solvent in this process is captured by the heat pump and used to heat the gas and/or contaminated solvent being inserted into the evaporator after condensation and purified solvent removal has occurred. This causes the carrying capacity of the gas to be increased. If the input to the system contains other volatile compounds, additional steps can be taken to ensure the solvent remains uncontaminated on the output, as would be within the knowledge of the skilled person. The rate of solvent processing is dependent in part on the gas speed through the system and its carrying capacity. The carrying capacity can be determined through psychrometric analysis of the fluid at the operating temperatures and pressures within the adiabatic loop.

Referring now to the accompanying drawings, exemplary embodiments of the present invention are illustrated.

Figure 1:
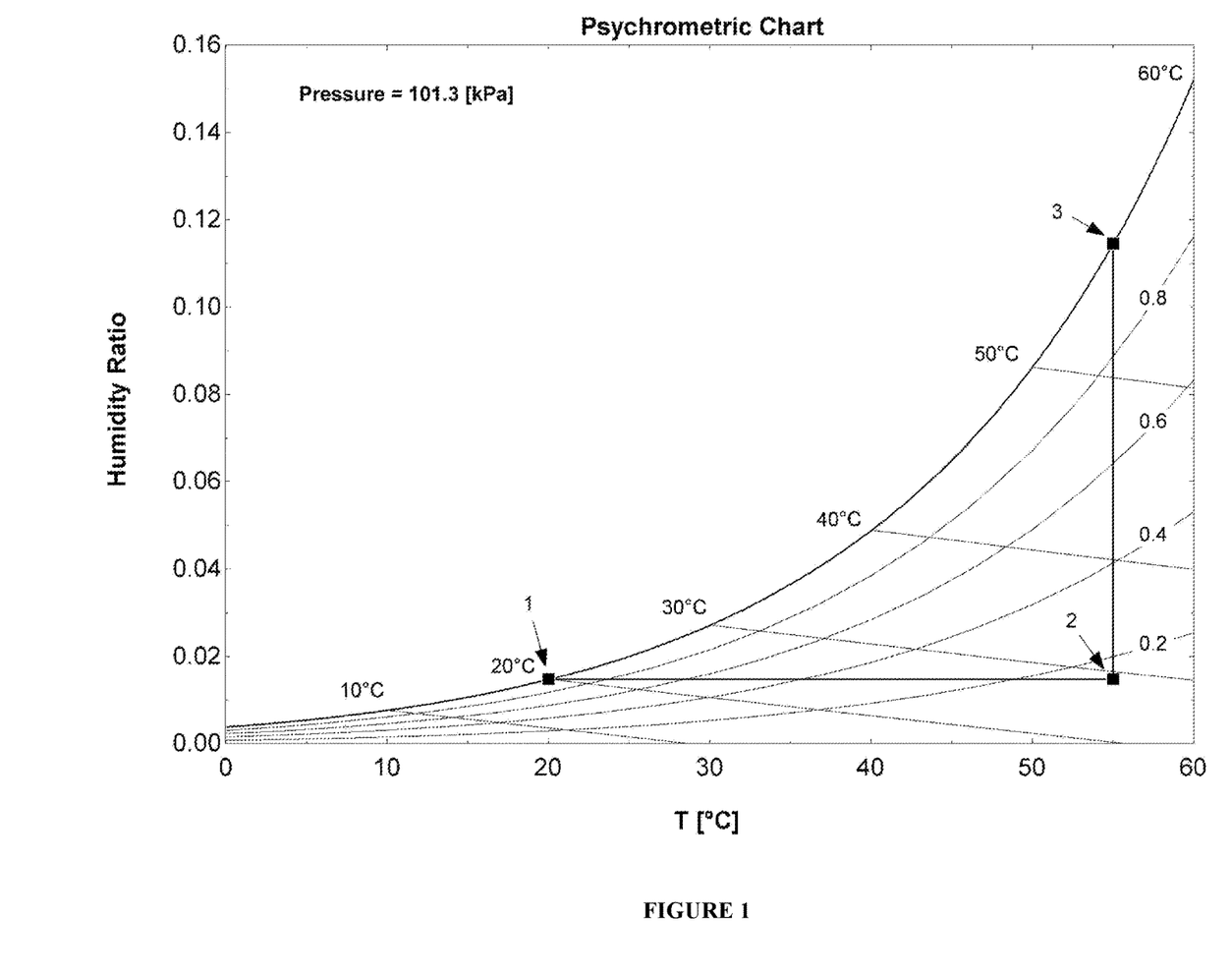
FIG. 1 is a psychrometric chart illustrating an exemplary thermodynamic cycle for processing water using the present invention.

Referring now in detail to FIG. 1, a psychrometric chart illustrates an exemplary thermodynamic cycle for processing water using the present invention. As can be seen, low humidity ratio gas is heated from a low temperature shown at point 1 to a high temperature (i.e. from 20° C. to 55° C.) shown at point 2, gaining the energy required to do so from the condensation process (from state 3 to state 1) and additional work done on the system. The high temperature air at state 2 is held at a constant temperature as the humidity ratio is increased until saturation is achieved at state 3. This saturated gas is condensed back to the initial state 1, releasing the carried solvent, and energy to drive the heating process described above.

Figure 2:
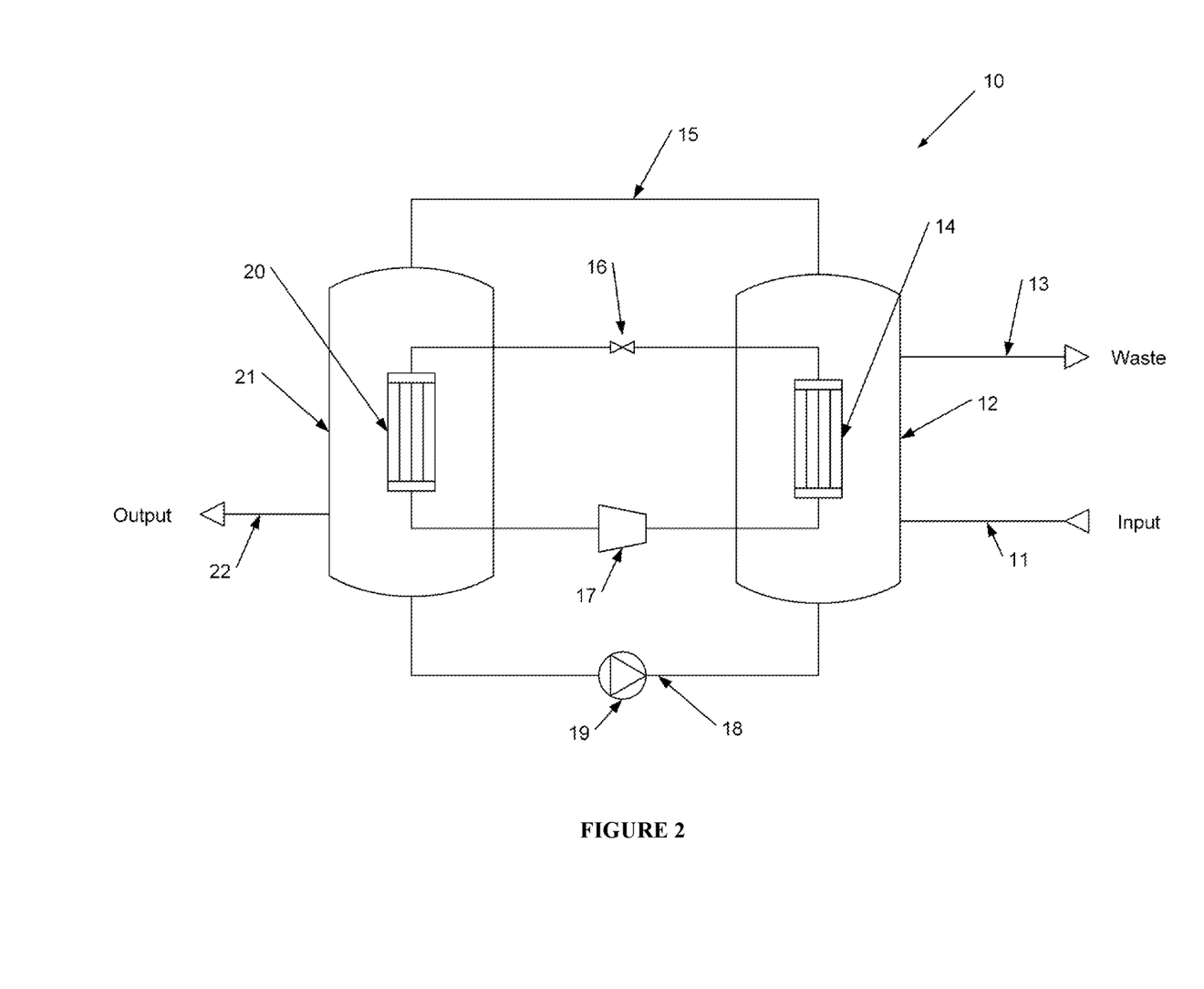
FIG. 2 is a schematic view of an exemplary system according to the present invention.

In FIG. 2, a simplified schematic of an exemplary process according to the present invention is illustrated, with the process generally referred to as 10, with both the heat pump and working gas circulation loops shown. In the process 10, contaminated solvent 11 is introduced into an evaporation chamber 12 at ambient temperature and pressure. Ambient temperature (i.e. 20° C.), low humidity ratio gas (shown as 18), circulated continuously by a fan 19, enters the evaporator chamber 12. This gas 18 is heated by energy from a condenser 14, causing its carrying capacity to increase with higher temperature (but below the solvent's boiling point, i.e. 55° C.). This gas 18 reaches vapor saturation to become a high humidity ratio gas 15, while being maintained at a constant temperature by the condenser 14 of the heat pump circuit. This process of evaporation is illustrated in FIG. 1 state 2 to state 3 and heating of the gas 18 is described by FIG. 1 state 1 to state 2. In a small-scale implementation of the heat pump system, an expansion valve 16 can be implemented, and work is done within a compressor 17 facilitating the transfer of heat energy from a low temperature evaporator 20 to the condenser 14. The saturated, high temperature gas 15 precipitates its contained solvent within a condensation chamber 21 by energy transfer via the evaporator 20, the cleaned solvent 22 exiting the condensation chamber 21. The resulting gas 18 is near ambient temperature and low humidity ratio once again as it circulates through the system. This condensation process is described by the psychrometric chart in FIG. 1 state 3 to state 1. A concentrated solid waste product 13 exits the evaporation chamber at a temperature above ambient, having precipitated when the solvent undergoes evaporation.

The spontaneous forward reaction of mixing solutes into solvents is determined by Gibbs' free energy. For the reverse reaction to occur, power must be added to the system at an appropriate rate as determined by mass and energy balance so that the operating temperatures are maintained within the system as well as satisfying this requirement for additional energy input. The internal kinetics that drive the process must meet the specification of operating environmental conditions to drive this non-spontaneous reaction. The process and system in its most basic form consists of a condensation chamber, evaporation chamber, and heat pump mechanism to transfer heat from the condensation chamber to the evaporation chamber. A working fluid likely consisting of air is used to circulate evaporated solvent from the evaporation chamber to the condensation chamber whereby the fluid is cooled below the dew point of the gas/vapour mixture thereby causing condensation. According to the Second Law of Thermodynamics, this heat transfer from a cold reservoir to a hot reservoir requires external work to be performed on the system. This additional work compensates for the energy required to drive the non-spontaneous reaction, thus maintaining the energy balance of the system. Furthermore, an additional heat source can be used to define the maximum and minimum operating temperatures of the gas 18 in the system, allowing for control over system performance metrics. The power introduced into the heat pump, additional heat from a heater or similar source and heat and mass transfer rates (heat and mass exchanger efficiency) of the evaporation and condensation chambers dictate the circulation rate of both the working fluid as well as the evaporation and condensation solvent circulation rates. A skilled person implementing this process should be able to isolate heat losses to the environment and be able to recapture much of the heat in the condensation chamber to be used to heat the input in the evaporation chamber. The power inputted to this system can be derived from a petrochemical or electrically powered compressor, thus the overall entropy of the universe increases, satisfying the Second Law of Thermodynamics.

Figure 3:
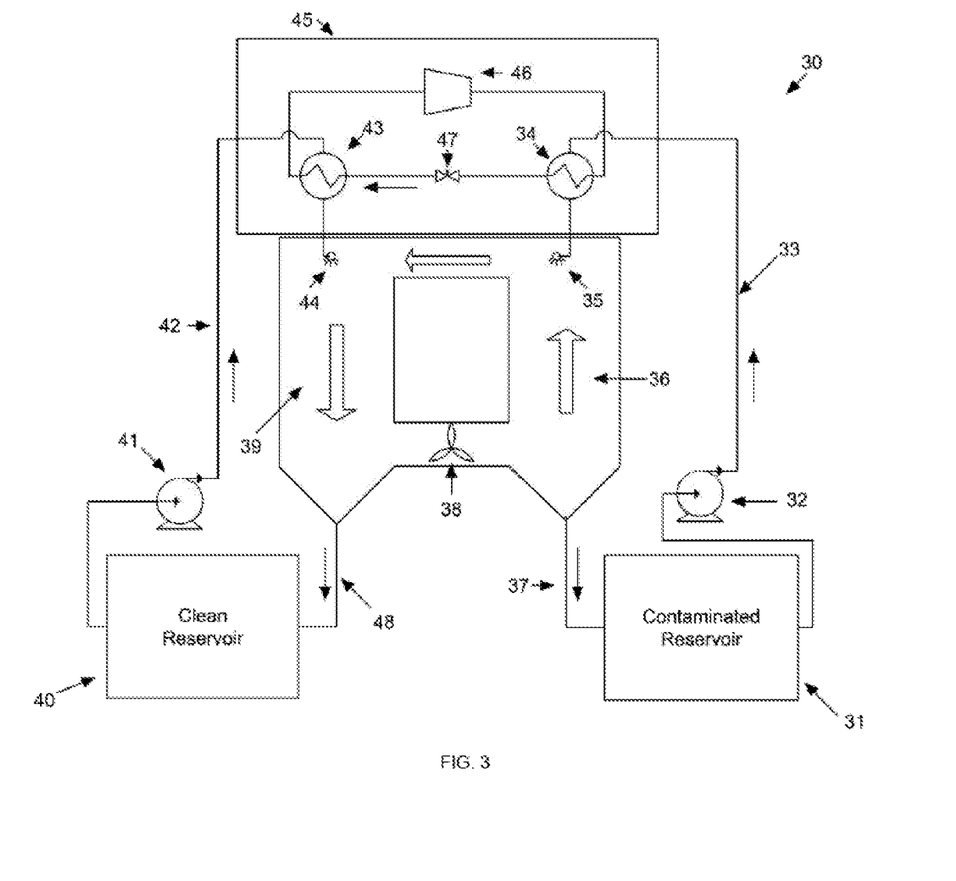
FIG. 3 is a schematic view of an exemplary system according to the present invention.

Turning now to FIG. 3, a simple exemplary system according to the present invention is modelled and illustrated and labelled with reference numeral 30. In the system 30, the input and output reservoirs 31, 32 are modeled as infinite thermal wells at ambient temperature. The internal components are assumed to be adiabatic with thermal losses arising from the rejection of solid concentrated contaminants of the original effluent above ambient temperature as well as from inefficiencies in the heat pump system. Furthermore, it is assumed that empirical psychrometric analysis of the contaminated water such as done in FIG. 1 yields accurate results. The solvent input is assumed to be liquid water at standard ambient temperature and pressure contaminated with a solute such as NaCl.

This input feed is pumped out of the contaminated solvent reservoir 31 by means of a pump 32, passing through a feed line 33 and through a heat exchanger 34 where the contaminated solvent is heated. The heated solvent then passes into an evaporation chamber 36 through a sprayer 35, whereby it undergoes the processes described above causing the evaporation of the solvent into the air due to psychrometric effects. This causes a concentration of contaminants to precipitate out of the solvent at or near the output temperature of the evaporation chamber 36. This precipitated waste is removed from the evaporation chamber 36 through an outlet line 37 and returned to the contaminated solvent reservoir 31 or directed to a different storage unit; it may also have some energy recaptured through a heat exchange mechanism and used to pre-heat the input stream if it is determined to be economical in a particular application of the present invention. The saturated vapour mixture output by the evaporation chamber 36 is circulated by a fan 38 or other mechanism to a condensation chamber 39 whereby the temperature is dropped causing the water to precipitate out of the air at nucleation sites such as atomized water droplets or on a porous surface or similar mechanism. In the embodiment of FIG. 3, temperature reduction is achieved by drawing cool (ambient temperature) solvent from the clean solvent reservoir 40 using a pump 41, the cool solvent passing through a feed line 42 to a heat exchanger 43 and subsequently sprayed through a sprayer 44 into the condensation chamber 39 adjacent the gas flow. The heat released by this condensation process is recaptured by a heat exchange system comprising a heat pump unit 45, the heat pump unit 45 comprising the two heat exchangers 34, 43, a refrigerant compressor 46 and an expansion valve 47, in a known indirect heat exchange configuration. This heat exchange system 45 then passes the energy back to the evaporation chamber 36 allowing the system to achieve desirable efficiency in a relatively simple, low-cost design. Given appropriate flow rates regulated by a control system, as would be within the knowledge of a skilled person, the atomized cool solvent cools down the saturated gas below the dew point and will provide nucleation sites for vapor to condense on yet be output at ambient temperature, helping to ensure that minimal heat is lost in the process. Cool, cleaned solvent is then released from the transport gas and can exit the condensation chamber 39 through an exit line 48 for deposit into the clean solvent reservoir 32. The cooled air now recirculates through the system to the evaporation chamber 36 where the cycles continues.

A second exemplary process flow diagram in FIG. 6 further illustrates the present invention, although in this embodiment the contaminated fluid is used as the cooled process fluid and is kept from intermingling with the evaporated fluid that it is cooling. This embodiment of the present invention illustrates a novel improvement to the thermodynamic process presented by Narayan et al. in *Thermodynamic analysis of humidification dehumidification desalination cycles* (Desalination and Water Treatment 16 (2010) 339-353), which presented three key performance metrics: gained output ratio (GOR), a measure of system energy efficiency, mass ratio (MR), and recovery ratio (RR), a measure of the mass flow of treated solvent out per contaminated solvent in. Sharqawy et al. in *Optimum thermal design of humidification dehumidification desalination systems* (Desalination 349 (2014) 10-21) presents current state of the art performance metrics in literature given the model first outlined by Narayan et al. The Sharqawy et al. analysis illustrates how contaminated solvent temperature, component efficiency, and ratio of flow rates of gas to solvent in the system amongst others can be tuned to maximize GOR and RR. The present invention as embodied in FIG. 6 may allow for improved control of low side and high side contaminated solvent temperature, thus potentially improving both GOR and RR as published in current literature. This is due to increased condensation allowed by a lower bottom temperature $T_{w,1}$ at 64, and lowered heat input requirement through work done on the heat pump to transfer heat to increase the top side temperature $T_{w,2}$ at 66. By including Second Law of Thermodynamics considerations in the process, physically realizable systems may be constructed. A skilled person in the art can model FIG. 6 similarly to the below to balance mass, enthalpy and entropy:

$$\dot{Q}_1 = \dot{m}_w(h_{w,in} - h_{w,0})$$

$$\dot{Q}_2 = \dot{Q}_1 + \dot{W}$$

$$COP = \frac{\dot{Q}_2}{\dot{W}} \leq COP_{Carnot}$$

$$\dot{W} > 0$$

$$\dot{m}_{pw} = \dot{m}_w - \dot{m}_b$$

$$\dot{m}_w h_{w,2} - \dot{m}_b h_{w,3} + \dot{m}_{da}(h_{a,1} - h_{a,2}) = 0$$

$$\dot{m}_b s_{w,3} - \dot{m}_w s_{w,2} + \dot{m}_{da}(s_{a,2} - s_{a,1}) \geq 0$$

$$\dot{m}_{pw} = \dot{m}_{da}(\omega_{a,2} - \omega_{a,1})$$

$$\dot{m}_w(h_{w,0} - h_{w,1}) - \dot{m}_{pw} h_{pw} + \dot{m}_{da}(h_{a,2} - h_{a,1}) = 0$$

$$\dot{m}_w(s_{w,1} - s_{w,0}) + \dot{m}_{pw} s_{pw} + \dot{m}_{da}(s_{a,1} - s_{a,2}) \geq 0$$

$$\dot{Q}_{in} = \dot{m}_w(h_{w,2} - h_{w,1}) = \dot{Q}_2 + \dot{Q}_{heater}$$

$$\dot{m}_w[(s_{w,2} - s_{w,1}) + (s_{w,0} - s_{w,in})] \geq 0$$

$$\varepsilon_h = \frac{\Delta \dot{H}_h}{\Delta \dot{H}_{h,max}}$$

$$\varepsilon_d = \frac{\Delta \dot{H}_d}{\Delta \dot{H}_{d,max}}$$

$$GOR = \frac{\dot{m}_{pw} h_{fg}}{\dot{Q}_{heater} + \dot{W}}$$

$$RR = \frac{\dot{m}_{pw}}{\dot{m}_w}$$

$$MR = \frac{\dot{m}_w}{\dot{m}_{da}}$$

Referring to FIG. 6 where, $\dot{m}_{da}$ Mass flow rate of dry gas through the closed loop 68, 69, 78, 79, controlled by a circulating mechanism 77
$\dot{m}_{pw}$ Mass flow rate of pure solvent at 70
$\dot{m}_w$ Mass flow rate of contaminated solvent at 62, 63, 64, 65 and 66
$\dot{m}_b$ Mass flow rate of concentrated contaminated solvent at 67
$\dot{Q}_1$ Heat extracted through 75, added to the heat pump at 71, used to control bottom side temperature $T_{w,0}$ at 63
$\dot{W}$ Work added to the heat pump through a compressor or similar mechanism 80 at 72
$\dot{Q}_2$ Heat insertion through 76, added from the heat pump at 73
$\dot{Q}_{heater}$ Heat insertion through 74, used to control top side temperature $T_{w,2}$ at 66
$\dot{Q}_{in}$ Total heat insertion, used to control top side temperature $T_{w,2}$ at 66
$T_{pw}$ Temperature of pure solvent at 70
$h_{pw}$ Specific enthalpy of pure solvent at 70
$s_{pw}$ Specific entropy of pure solvent at 70
$T_{w,in}$ Temperature of contaminated solvent at 62
$h_{w,in}$ Specific enthalpy of contaminated solvent at 62
$s_{w,in}$ Specific entropy of contaminated solvent at 62
$T_{w,0}$ Temperature of contaminated solvent at 63
$h_{w,0}$ Specific enthalpy of contaminated solvent at 63
$s_{w,0}$ Specific entropy of contaminated solvent at 63
$T_{w,1}$ Temperature of contaminated solvent at 64
$h_{w,1}$ Specific enthalpy of contaminated solvent at 64
$s_{w,1}$ Specific entropy of contaminated solvent at 64
$T_{w,2}$ Temperature of contaminated solvent at 66
$h_{w,2}$ Specific enthalpy of contaminated solvent at 66
$s_{w,2}$ Specific entropy of contaminated solvent at 66
$T_{w,3}$ Temperature of concentrated contaminated solvent at 67
$h_{w,3}$ Specific enthalpy of concentrated contaminated solvent at 67
$s_{w,3}$ Specific entropy of concentrated contaminated solvent at 67
$T_{a,1}$ Temperature of gas at 68
$h_{a,1}$ Specific enthalpy of gas at 68
$s_{a,1}$ Specific entropy of gas at 68
$\omega_{a,1}$ Ratio of pure solvent to gas at 68
$T_{a,2}$ Temperature of gas at 69
$h_{a,2}$ Specific enthalpy of gas at 69
$s_{a,2}$ Specific entropy of gas at 69
$\omega_{a,2}$ Ratio of pure solvent to gas at 69
COP Coefficient of performance for the heat pump consisting of 75, 80, 76, 81
$COP_{Carnot}$ Theoretical maximum coefficient of performance of a Carnot heat pump
$\varepsilon_h$ Efficiency of evaporator 78
$\Delta \dot{H}_h$ Enthalpy transfer within evaporator 78
$\Delta \dot{H}_{h,max}$ Theoretical maximum enthalpy transfer within evaporator 78
$\varepsilon_d$ Efficiency of condenser 79
$\Delta \dot{H}_d$ Enthalpy transfer within condenser 79
$\Delta \dot{H}_{d,max}$ Theoretical maximum enthalpy transfer within condenser 79
$h_{fg}$ Enthalpy of vaporization of pure solvent
GOR Gained output ratio
RR Recovery ratio
MR Mass ratio Evaporator 78 and condenser 79 are modeled as heat and mass exchanger devices, whereby in this exemplary embodiment a counter-flow configuration is used. A device constructed in a cross or co-current flow configuration could similarly be designed by a skilled person to achieve the same considerations for enhanced energy recapture and performance increases with the use of a heat pump. The system is to operate at atmospheric pressure, with $T_{w,1}$ and $T_{w,2}$ between the melting and boiling point of the contaminated input solvent respectively. $T_{pw}$ is assumed to condense within 79 between $T_{a,1}$ and $T_{a,2}$. Through the use of an indirect heat and mass exchange device in 79 in this exemplary embodiment, no contamination is transferred from the cooling fluid input at 63 to 79 to the pure solvent 70 or gas streams 68, 69.

Experimental Results

A bench-scale apparatus according to the present invention was constructed and experimental results were obtained.

The apparatus was found to operate at the following mean temperatures and measured parameters in a recent experiment:

Ambient temperature: 29.0° C.±1.0° C.
Mean Operational Temperatures:
Mean condenser air temperature: 62.96° C.±0.50° C.
Mean condenser water temperature: 17.19° C.±0.50° C.
Mean evaporator air temperature: 53.41° C.±0.50° C.
Mean evaporator water temperature: 30.14° C.±0.50° C.
Air Flow Rates:
Air velocity pre-evaporation chamber: 1.3 m/s f 0.1 m/s Air velocity post-evaporation chamber: 1.0 m/s f 0.1 m/s
Water Production:
Initial distillate water level: 700 mL f 50 mL
Final distillate water level: 1050 mL 50 mL
Distillate produced: 350 mL f 50 mL
Power and Energy Consumption:
Mean power consumption: 326 W
Approximate run time: 2 hours
Approximate energy consumption: 652 Whr
Water Salinity:
Initial distillate resistance: 1.6 MΩ±0.2 MΩ
Final distillate resistance: 2.0 MΩ±0.2 MΩ
Initial input resistance: 160 kΩ±20 kΩ
Final input resistance: 180 kΩ±20 kΩ

Figure 4:
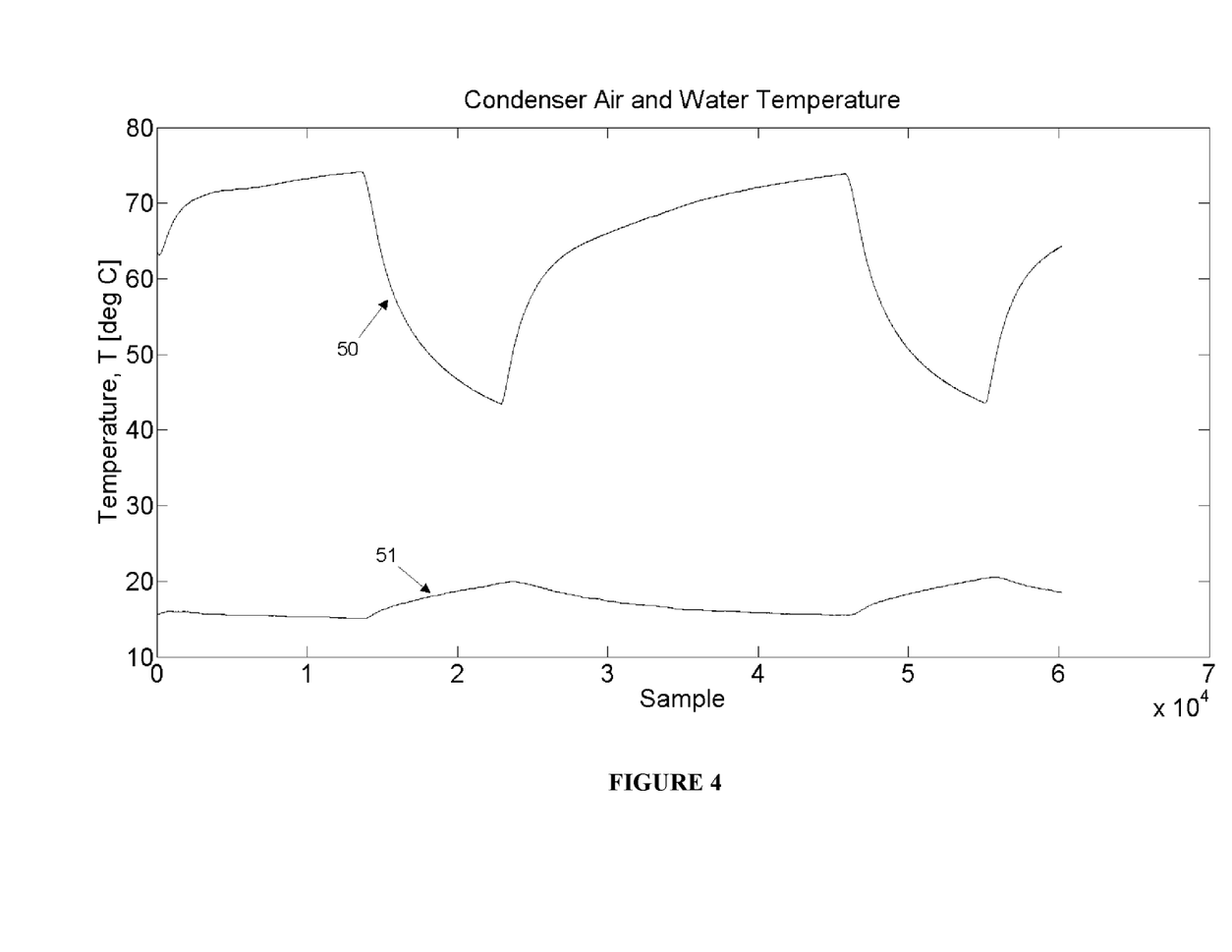
FIG. 4 is a chart illustrating condenser air and water temperature data collected during testing.

FIG. 4 contains the condenser air temperature data 50 and water temperature data 51 collected over the course of this experiment. The compressor control system throttled on and off resulting in a modulation of the temperature. Energy input into the system must maintain the separation between air and water temperature. The water temperature was cooled initially by running the system to reach steady state from ambient.

Figure 5:
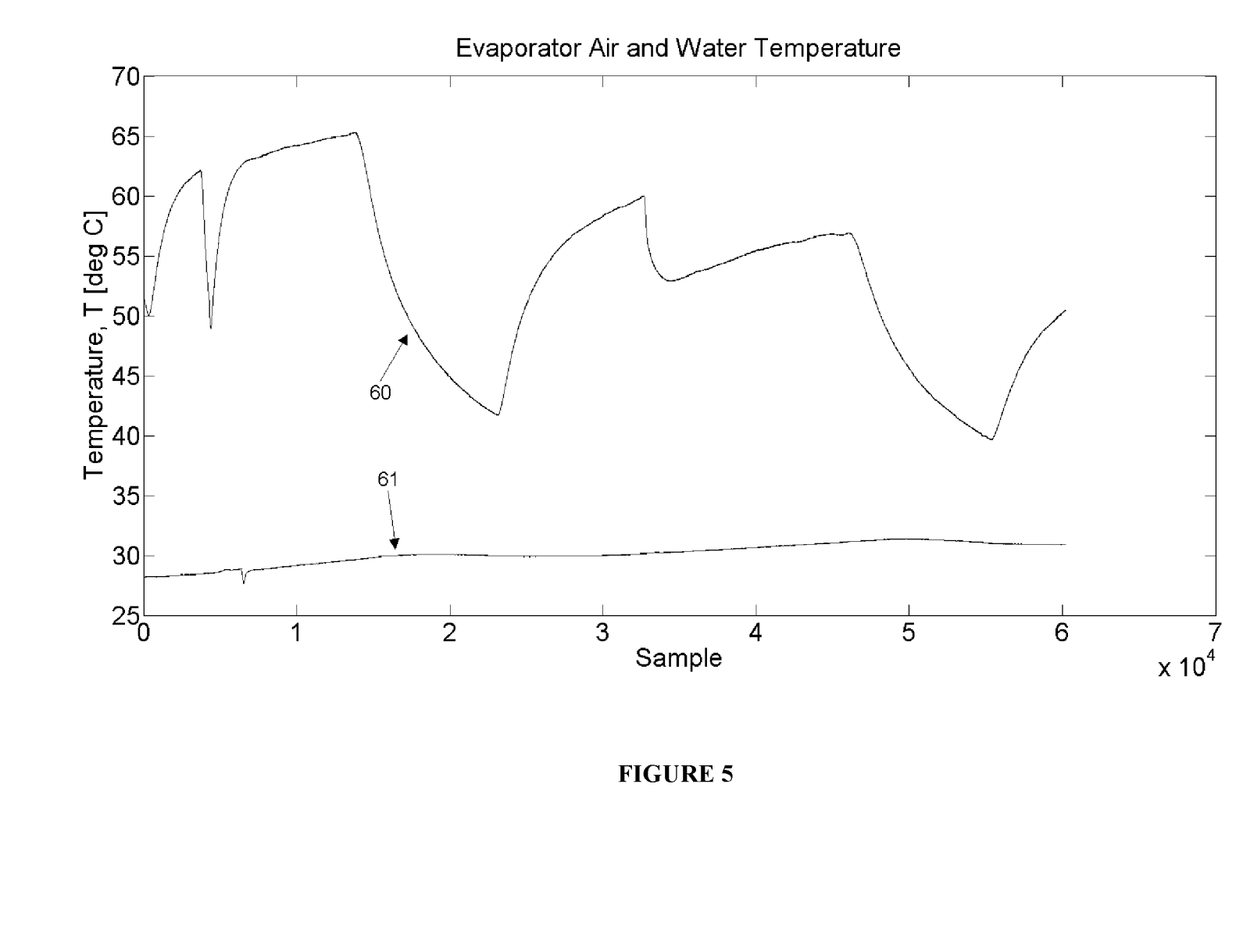
FIG. 5 is a chart illustrating evaporator air and water temperature data collected during testing.

FIG. 5 contains the evaporator air temperature data 60 and water temperature data 61 collected over the course of this experiment. There is a general trend toward the air and water temperatures converging over time as energy is added to the evaporation chamber. The drops in air temperature are accounted for by secondary measurements where an outside thermometer was used to verify the readings given by the internal temperature sensors.

The foregoing is considered as illustrative only of the principles of the invention. The scope of the claims should not be limited by the exemplary embodiments set forth in the foregoing, but should be given the broadest interpretation consistent with the specification as a whole.

The invention claimed is:

1. A system for at least partial decontamination of a contaminated fluid to produce a purified fluid, the system comprising:
    a first container that contains the contaminated fluid and a second container that contains the purified fluid;
    an evaporation chamber that at least partially evaporates the contaminated fluid to form an evaporated fluid;
    a condensation chamber that condenses the purified fluid;
    the evaporation chamber and the condensation chamber in fluid communication;
    the evaporation chamber and the condensation chamber retain a transport gas for transporting the evaporated fluid to the condensation chamber, the transport gas becoming at least partially saturated with the evaporated fluid in the evaporation chamber, the transport gas releasing the purified fluid in the condensation chamber;
    an inlet for introducing the contaminated fluid to the evaporation chamber;
    a purified fluid outlet for withdrawing the purified fluid from the condensation chamber;
    a pump that supplies a process fluid from the first or the second container, in the form of either at least a portion of the contaminated fluid or the purified fluid respectively; and
    a heat pump comprising a first and a second heat exchanger;
    wherein the process fluid passes through the second heat exchanger to remove heat from the process fluid to form a cooled process fluid, and the cooled process fluid subsequently draws heat from the transport gas to promote condensation of the purified fluid to cool the transport gas in the condensation chamber; and
    wherein the heat removed from the process fluid by the second heat exchanger is transferred to the contaminated fluid by the first heat exchanger via the heat pump using external work for introduction to the contaminated fluid before the contaminated fluid enters the evaporation chamber, to promote evaporation of the contaminated fluid in the evaporation chamber.

2. The system of claim 1 wherein the evaporation chamber and the condensation chamber form a closed loop, the system further comprising a fan that continuously circulates the transport gas between the evaporation chamber and the condensation chamber.

3. The system of claim 2 further comprising a contaminant outlet for withdrawing contaminant from the closed loop.

4. The system of claim 1 being configured such that the cooled process fluid is atomized through injection into the condensation chamber, creating nucleation sites to promote condensation.

5. The system of claim 1 being configured such that the at least a portion of the contaminated fluid is cooled to form the cooled process fluid, and the cooled process fluid subsequently and indirectly draws heat from the transport gas to promote condensation of the purified fluid in the condensation chamber.

6. The system of claim 5 being configured such that the process fluid is returned to the first container after drawing heat from the transport gas.

7. A method for at least partially decontaminating a contaminated fluid to produce a purified fluid, the method comprising the steps of:
    a. subjecting the contaminated fluid to evaporation conditions;
    b. evaporating at least part of the contaminated fluid to form an evaporated fluid,
    c. transporting the evaporated fluid to a condensing chamber for condensing a purified fluid from the evaporated fluid;
    d. providing a heat pump comprising a first and second heat exchanger;
    e. supplying a process fluid, in the form of a portion of either the contaminated fluid or the purified fluid, to the second heat exchanger;
    f. allowing the second heat exchanger to remove heat from the process fluid to form a cooled process fluid;
    g. transferring, by the first heat exchanger via the heat pump using external work, the heat removed by the second heat exchanger for introduction to the contaminated fluid before subjecting the contaminated fluid to the evaporation conditions, and for the evaporating of the at least part of the contaminated fluid to form the evaporated fluid; and
    h. removing heat from the evaporated fluid to promote the condensing of the purified fluid using the cooled process fluid.

8. The method of claim 7 further comprising the step after step c. of retaining at least a portion of the purified fluid for subsequent supply to the second heat exchanger.

9. The method of claim 7 wherein step c. comprises using a transport gas for transporting the evaporated fluid to the condensing chamber.

10. The method of claim 9 wherein the transport gas is allowed to become at least partially saturated with the evaporated fluid before movement to the condensing chamber.

11. The method of claim 10 further comprising the step after step g. of circulating the transport gas back to an area where the part of the contaminated fluid is evaporated to form the evaporated fluid.

12. The method of claim 7 wherein step b. further comprises removing contaminants from the contaminated fluid by the evaporating of the contaminated fluid.

13. The method of claim 7 wherein the cooled process fluid is derived from the purified fluid and step g. further comprises injecting the cooled process fluid into the evaporated fluid.

14. The method of claim 13 wherein the injection includes atomization of the cooled process fluid, creating nucleation sites to promote condensation.

15. The method of claim 7 wherein the process fluid is the portion of the contaminated fluid, further comprising the steps after step g. of     introducing at least a part of the portion of the contaminated fluid to evaporation conditions;

evaporating the at least a part of the portion of the contaminated fluid to form part of the evaporated fluid; and     condensing purified fluid from the part of the evaporated fluid.

16. The method of claim 7 wherein the process fluid is the portion of the purified fluid, further comprising the step after step g. of retaining the portion of the purified fluid.

17. The method of claim 7 wherein the process fluid is the portion of the purified fluid, further comprising the step after step g. of reusing the portion of the purified fluid for condensing further purified fluid.

\* \* \* \* \*

UNITED STATES PATENT AND TRADEMARK OFFICE
CERTIFICATE OF CORRECTION

PATENT NO. : 10,829,389 B2  
APPLICATION NO. : 16/213086  
DATED : November 10, 2020  
INVENTOR(S) : Aarya Shahsavar, Alexander Juin Hui Chan and Dawson Gordon James Page 1 of 1

It is certified that error appears in the above-identified patent and that said Letters Patent is hereby corrected as shown below:

On the Title Page

Please replace the Assignee's name at Item (73) with: "Innocorps Research Corporation".

Signed and Sealed this  
Ninth Day of August, 2022

Katherine Kelly Vidal  
*Director of the United States Patent and Trademark Office*